(12) United States Patent
Tate (10) Patent No.: US 6,438,552 B1
(45) Date of Patent: Aug. 20, 2002

(54) SQL-BASED AUTOMATED HISTOGRAM BIN DATA DERIVATION ASSIST

(75) Inventor: Brian Don Tate, Escondido, CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/411,818

(22) Filed: Oct. 1, 1999

Related U.S. Application Data (60) Provisional application No. 60/102,831, filed on Oct. 2, 1998.

(51) Int. Cl.[7] .............................................. G06F 17/30
(52) U.S. Cl. ................ 707/10; 707/2; 707/3; 707/101; 707/102; 707/104
(58) Field of Search ............... 707/2, 3, 10, 101, 707/102, 1, 104; 705/7, 8, 9, 10, 35, 36, 37, 38; 706/46, 47

(56) References Cited

U.S. PATENT DOCUMENTS

| | | | |
|---|---|---|---|
| 5,412,806 A | 5/1995 | Du et al. | |
| 5,448,727 A | 9/1995 | Annevelink | |
| 5,590,322 A | 12/1996 | Harding et al. | |
| 5,701,400 A | 12/1997 | Amado | |
| 5,710,915 A | 1/1998 | McElhiney | |
| 5,734,887 A | 3/1998 | Kingberg et al. | |
| 5,787,413 A | 7/1998 | Kauffman et al. | |
| 5,787,425 A | 7/1998 | Bigus | |
| 5,799,310 A | 8/1998 | Anderson et al. | |
| 5,806,066 A | 9/1998 | Golshani et al. | |
| 5,822,751 A | * 10/1998 | Gray et al. | 707/3 |
| 5,895,465 A | 4/1999 | Guha | |
| 5,960,435 A | * 9/1999 | Rathmann et al. | 707/101 |

* cited by examiner

Primary Examiner—Kim Vu
Assistant Examiner—Baoquoc To
(74) Attorney, Agent, or Firm—Gates & Cooper (57) ABSTRACT

A method, apparatus, and article of manufacture for performing data mining applications in a massively parallel relational database management system. A scalable data mining function comprising an automated histogram bin data derivation assist function is instantiated and parameterized via an analytic application programming interface (API). The automated histogram bin data derivation assist function comprises a query that is performed directly within the relational database management system, wherein the automated histogram bin data derivation assist function derives a new data element in the relational database based on a relation of a particular value of another data element to that element's overall distribution in the relational database.

36 Claims, 5 Drawing Sheets

SQL-BASED AUTOMATED HISTOGRAM BIN DATA DERIVATION ASSIST

CROSS-REFERENCE TO RELATED APPLICATIONS

This application claims the benefit under 35 U.S.C. Section 119(e) of the co-pending and commonly-assigned U.S. provisional patent application Ser. No. 60/102,831, filed Oct. 2, 1998, by Timothy E. Miller, Brian D. Tate, James D. Hildreth, Miriam H. Herman, Todd M. Brye, and James E. Pricer, entitled Teradata Scalable Discovery, which application is incorporated by reference herein.

This application is also related to the following co-pending and commonly-assigned utility patent applications:

Application Ser. No. PCT/US99/22966, filed on same date herewith, by Timothy E. Miller, Brian D. Tate, James D. Hildreth, Todd M. Brye, Anthony L. Rollins, James E. Pricer, and Tej Anand, entitled SQL-Based Analytic Algorithms, Application Ser. No. 09/410,528, filed on same date herewith, by Brian D. Tate et al., entitled SQL-Based Analytic Algorithm for Association, Application Ser. No. 09/410,531, filed on same date herewith, by James D. Hildreth, entitled SQL-Based Analytic Algorithm for Clustering, Application Ser. No. 09/410,530, filed on same date herewith, by Todd M. Brye, entitled SQL-Based Automated Histogram Bin Data Derivation Assist, Application Ser. No. 09/410,534, filed on same date herewith, by Brian D. Tate, entitled SQL-Based Automated, Adaptive, Histogram Bin Data Description Assist, Application Ser. No. PCT/US99/22995, filed on same date herewith, by Timothy E. Miller, Brian D. Tate, Miriam H. Herman, Todd M. Brye, and Anthony L. Rollins, entitled Data Mining Assists in a Relational Database Management System, Application Ser. No. 09/411,809, filed on same date herewith, by Todd M. Brye, Brian D. Tate, and Anthony L. Rollins, entitled SQL-Based Data Reduction Techniques for Delivery Data to Analytic Tools, Application Ser. No. PCT/US99/23031, filed on same date herewith, by Timothy E. Miller, Miriam H. Herman, and Anthony L. Rollins, entitled Techniques for Deploying Analytic Models in Parallel, Application Ser. No. PCT/US99/23019, filed on same date herewith, by Timothy E. Miller, Bran D. Tate, and Anthony L. Rollins, entitled Analytic Logical Data Model, all of which are incorporated by reference herein.

BACKGROUND OF THE INVENTION

1. Field of the Invention

This invention relates in general to a relational database management system, and in particular, to data mining assists in a relational database management system.

2. Description of Related Art

Relational databases are the predominate form of database management systems used in computer systems. Relational database management systems are often used in so-called "data warehouse" applications where enormous amounts of data are stored and processed. In recent years, several trends have converged to create a new class of data warehousing applications known as data mining applications. Data mining is the process of identifying and interpreting patterns in databases, and can be generalized into three stages.

Stage one is the reporting stage, which analyzes the data to determine what happened. Generally, most data warehouse implementations start with a focused application in a specific functional area of the business. These applications usually focus on reporting historical snap shots of business information that was previously difficult or impossible to access. Examples include Sales Revenue Reporting, Production Reporting and Inventory Reporting to name a few.

Stage two is the analyzing stage, which analyzes the data to determine why it happened. As stage one end-users gain previously unseen views of their business, they quickly seek to understand why certain events occurred; for example a decline in sales revenue. After discovering a reported decline in sales, data warehouse users will then obviously ask, "Why did sales go down?" Learning the answer to this question typically involves probing the database through an iterative series of ad hoc or multidimensional queries until the root cause of the condition is discovered. Examples include Sales Analysis, Inventory Analysis or Production Analysis.

Stage three is the predicting stage, which tries to determine what will happen. As stage two users become more sophisticated, they begin to extend their analysis to include prediction of unknown events. For example, "Which end-users are likely to buy a particular product", or "Who is at risk of leaving for the competition?" It is difficult for humans to see or interpret subtle relationships in data, hence as data warehouse users evolve to sophisticated predictive analysis they soon reach the limits of traditional query and reporting tools. Data mining helps end-users break through these limitations by leveraging intelligent software tools to shift some of the analysis burden from the human to the machine, enabling the discovery of relationships that were previously unknown.

Many data mining technologies are available, from single algorithm solutions to complete tool suites. Most of these technologies, however, are used in a desktop environment where little data is captured and maintained. Therefore, most data mining tools are used to analyze small data samples, which were gathered from various sources into proprietary data structures or flat files. On the other hand, organizations are beginning to amass very large databases and end-users are asking more complex questions requiring access to these large databases.

Unfortunately, most data mining technologies cannot be used with large volumes of data. Further, most analytical techniques used in data mining are algorithmic-based rather than data-driven, and as such, there are currently little synergy between data mining and data warehouses. Moreover, from a usability perspective, traditional data mining techniques are too complex for use by database administrators and application programmers, and are too difficult to change for a different industry or a different customer.

Thus, there is a need in the art for data mining applications that directly operate against data warehouses, and that allow non-statisticians to benefit from advanced mathematical techniques available in a relational environment.

SUMMARY OF THE INVENTION

To overcome the limitations in the prior art described above, and to overcome other limitations that will become apparent upon reading and understanding the present specification, the present invention discloses a method, apparatus, and article of manufacture for performing data mining applications in a massively parallel relational database management system (RDBMS). A scalable data mining function comprising an automated histogram bin data derivation assist function is instantiated and parameterized via an analytic application programming interface (API). The automated histogram bin data derivation assist function comprises a query that is performed directly within the relational database management system, wherein the Automated Histogram Bin Data Derivation Assist function derives a new data element in the relational database based on a relation of a particular value of another data element to that element's overall distribution in the relational database.

An object of the present invention is to provide more efficient usage of parallel processor computer systems. An object of the present invention is to provide a foundation for data mining tool sets in relational database management systems. Further, an object of the present invention is to allow data mining of large databases.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Overview

The present invention provides a relational database management system (RDBMS) that supports data mining operations of relational databases. In essence, advanced analytic processing capabilities for data mining applications are placed where they belong, i.e., close to the data. Moreover, the results of these analytic processing capabilities can be made to persist within the database or can be exported from the database. These analytic processing capabilities and their results are exposed externally to the RDBMS by an application programmable interface (API).

According to the preferred embodiment, the data mining process is an iterative approach referred to as a "Knowledge Discovery Analytic Process" (KDAP). There are six major tasks within the KDAP:

1. Understanding the business objective.
2. Understanding the source data available.
3. Selecting the data set and "pre-processing" the data.
4. Designing the analytic model.
5. Creating and testing the models.
6. Deploying the analytic models.

The present invention provides various components for addressing these tasks:

An RDBMS that executes Structured Query Language (SQL) statements against a relational database.

An analytic Application Programming Interface (API) that creates scalable data mining functions comprised of complex SQL statements.

Application programs that instantiate and parameterize the analytic API.

Analytic algorithms utilizing:
Extended ANSI SQL statements,
a Call Level Interface (CLI) comprised of SQL staterments and programmatic iteration, and
a Data Reduction Utility Program comprised of SQL statements and programmatic iteration.

An analytical logical data model (LDM) that stores results from and information about the advanced analytic processing in the RDBMS.

A parallel deployer that controls parallel execution of the results of the analytic algorithms that are stored in the analytic logical data model.

The benefits of the present invention include:

Data mining of very large databases directly within a relational database.

Management of analytic results within a relational database.

A comprehensive set of analytic operations that operate within a relational database management system.

Application integration through an object-oriented API.

These components and benefits are described in more detail below.

Hardware Environment

Figure 1:
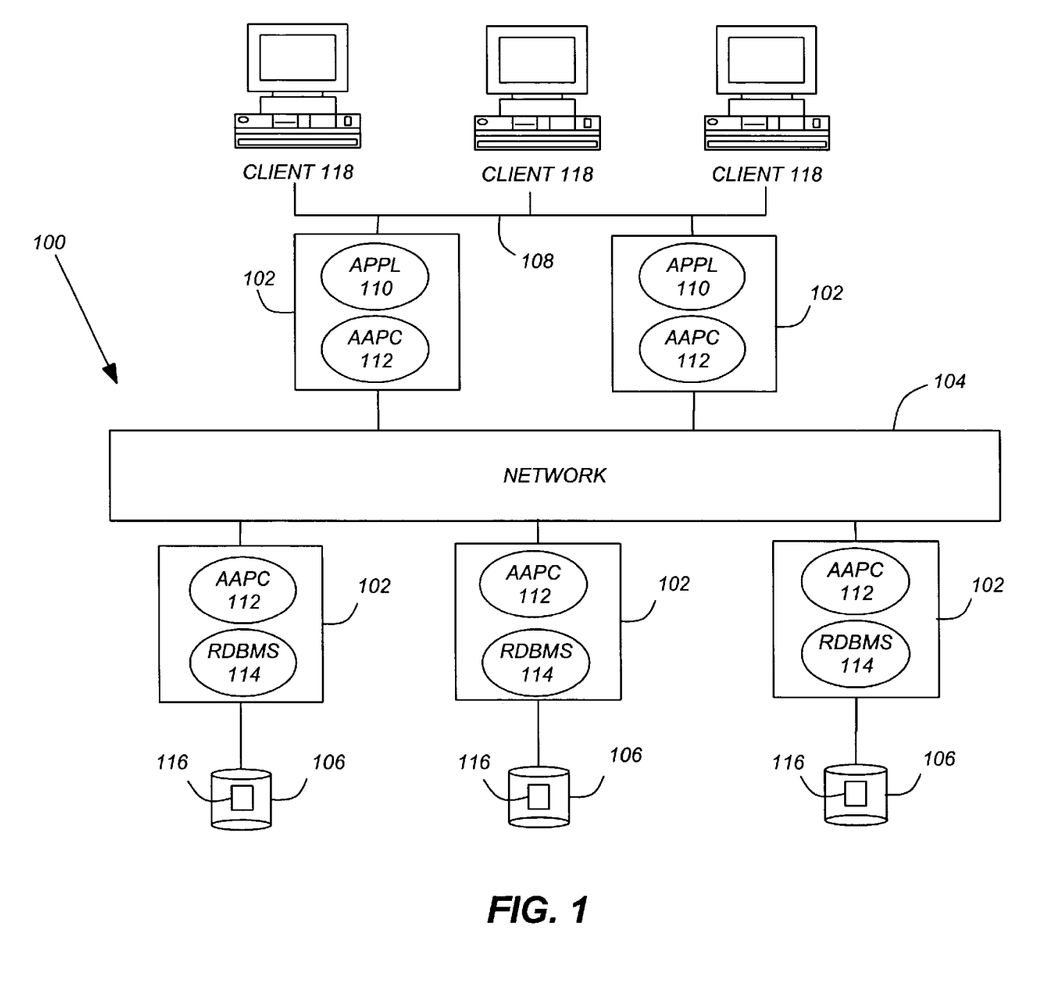
FIG. 1 is a block diagram that illustrates an exemplary computer hardware environment that could be used with the preferred embodiment of the present invention.

FIG. 1 is a block diagram that illustrates an exemplary computer hardware environment that could be used with the preferred embodiment of the present invention. In the exemplary computer hardware environment, a massively parallel processing MPP) computer system 100 is comprised of one or more processors or nodes 102 interconnected by a network 104. Each of the nodes 102 is comprised of one or more processors, random access memory (RAM), read-only memory (ROM), and other components. It is envisioned that attached to the nodes 102 may be one or more fixed and/or removable data storage units DSUs) 106 and one or more data communications units (DCUs) 108, as is well known in the art.

Each of the nodes 102 executes one or more computer programs, such as a Data Mining Application (APPL) 110 performing data mining operations, Advanced Analytic Processing Components (AAPC) 112 for providing advanced analytic processing capabilities for the data mining operations, and/or a Relational Database Management System (RDBMS) 114 for managing a relational database 116 stored on one or more of the DSUs 106 for use in the data mining applications, wherein various operations are performed in the APPL 110, AAPC 112, and/or RDBMS 114 in response to commands from one or more Clients 118. In alternative embodiments, the APPL 110 may be executed in one or more of the Clients 118, or on an application server on a different platform attached to the network 104.

Generally, the computer programs are tangibly embodied in and/or retrieved from RAM, ROM, one or more of the DSUs 106, and/or a remote device coupled to the computer system 100 via one or more of the DCUs 108. The computer programs comprise instructions which, when read and executed by a node 102, causes the node 102 to perform the steps necessary to execute the steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention. In addition, it should be understood that the present invention may also apply to other computer programs than those disclosed herein.

Logical Architecture

Figure 2:
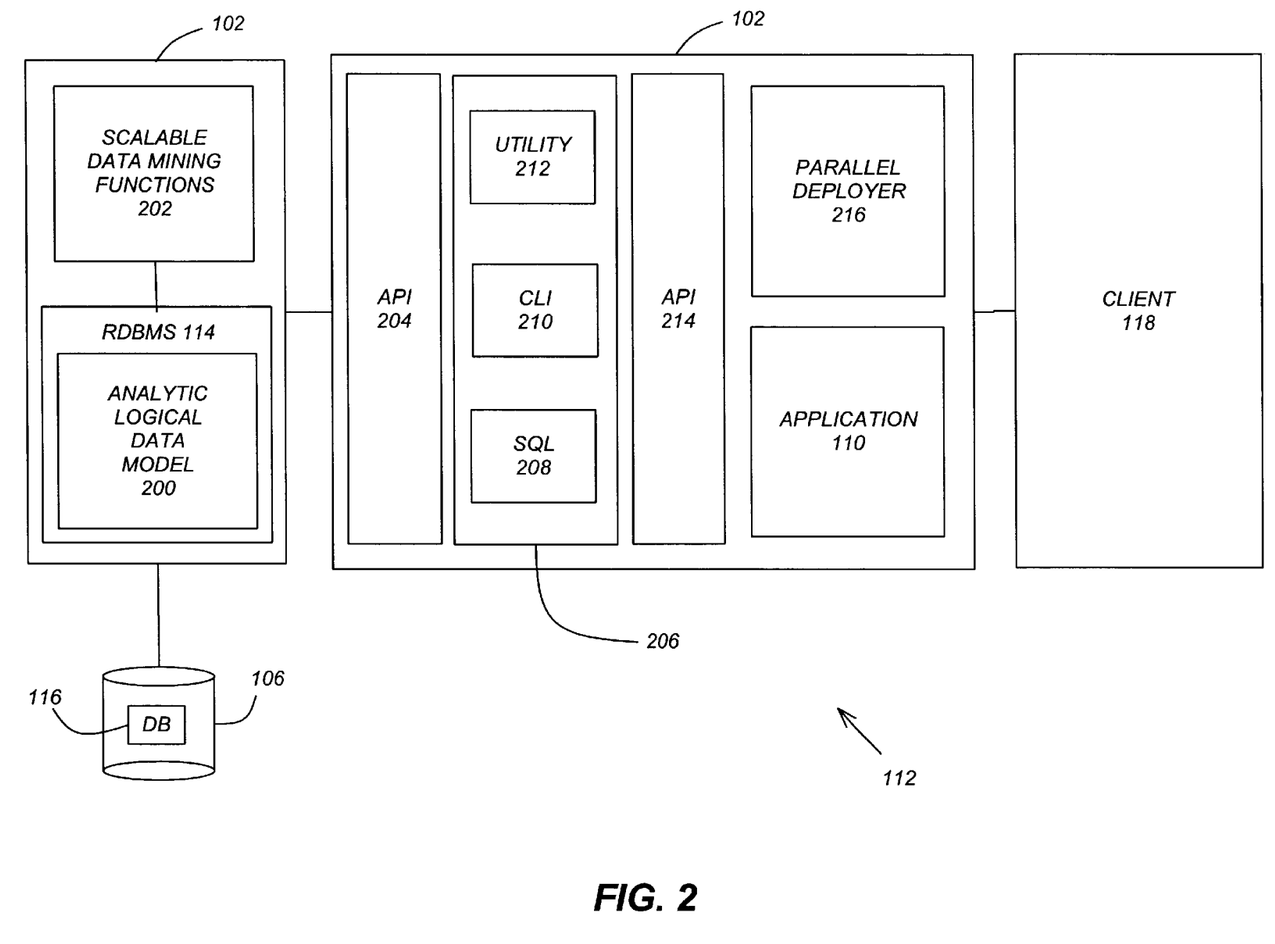
FIG. 2 is a block diagram that illustrates an exemplary logical architecture that could be used with the preferred embodiment of the present invention.

FIG. 2 is a block diagram that illustrates an exemplary logical architecture of the AAPC 112, and its interaction with the APPL 110, RDBMS 114, relational database 116, and Client 118, according to the preferred embodiment of the present invention. In the preferred embodiment, the AAPC 112 includes the following components:

An Analytic Logical Data Model (LDM) 200 that stores results from the advanced analytic processing in the RDBMS 114, One or more Scalable Data Mining Functions 202 that comprise complex, optimized SQL statements that perform advanced analytic processing in the RDBMS 114, An Analytic Application Programming Interface (API) 204 that provides a mechanism for an APPL 110 or other component to invoke the Scalable Data Mining Functions 202, One or more Analytic Algorithms 206 that can operate as standalone applications or can be invoked by another component, wherein the Analytic Algorithms 206 comprise:

Extended ANSI SQL 208 that can be used to implement a certain class of Analytic Algorithms 206, A Call Level Interface (CLI) 210 that can be used when a combination of SQL and programmatic iteration is required to implement a certain class of Analytic Algorithms 206, and A Data Reduction Utility Program 212 that can be used to implement a certain class of Analytic Algorithms 206 where data is first reduced using SQL followed by programmatic iteration.

An Analytic Algorithm Application Programming Interface (API) 214 that provides a mechanism for an APPL 110 or other components to invoke the Analytic Algorithms 206, A Parallel Deployer 216 that controls parallel executions of the results of an Analytic Algorithm 206 (sometimes referred to as an analytic model) that are stored in the Analytic LDM 200, wherein the results of executing the Parallel Deployer 216 are stored in the RDBMS 114.

Note that the use of these various components is optional, and thus only some of the components may be used in any particular configuration.

The preferred embodiment is oriented towards a multi-tier logical architecture, in which a Client 118 interacts with the various components described above, which, in turn, interface to the RDBMS 114 to utilize a large central repository of enterprise data stored in the relational database 116 for analytic processing.

In one example, a Client 118 interacts with an APPL 110, which interfaces to the Analytic API 204 to invoke one or more of the Scalable Data Mining Functions 202, which are executed by the RDBMS 114. The results from the execution of the Scalable Data Mining Functions 202 would be stored as an analytic model within an Analytic LDM 200 in the RDBMS 114.

In another example, a Client 118 interacts with one or more Analytic Algorithms 206 either directly or via the Analytic Algorithm API 214. The Analytic Algorithms 206 comprise SQL statements that may or may not include programmatic iteration, and the SQL statements are executed by the RDBMS 114. In addition, the Analytic Algorithms 206 may or may not interface to the Analytic API 204 to invoke one or more of the Scalable Data Mining Functions 202, which are executed by the RDBMS 114. Regardless, the results from the execution of the Analytic Algorithms 206 would be stored as an ananlytic model within an Analytic LDM 200 in the RDBMS 114.

In yet another example, a Client 118 interacts with the Parallel Deployer 216, which invokes parallel instances of the results of the Analytic Algorithms 206, sometimes referred to as an Analytic Model. The Analytic Model is stored in the Analytic LDM 200 as a result of executing an instance of the Analytic Algorithms 206. The results of executing the Parallel Deployer 216 are stored in the RDBMS 114.

In still another example, a Client 118 interacts with the APPL 110, which invokes one or more Analytic Algorithms 206 either directly or via the Analytic Algorithm API 214. The results would be stored as an ananlytic model within an Analytic LDM 200 in the RDBMS 114.

The overall goal is to significantly improve the performance, efficiency, and scalability of data mining operations by performing compute and/or I/O intensive operations in the various components. The preferred embodiment achieves this not only through the parallelism provided by the MPP computer system 100, but also from reducing the amount of data that flows between the APPL 110, AAPC 112, RDBMS 114, Client 118, and other components.

Those skilled in the art will recognize that the exemplary configurations illustrated and discussed in conjunction with FIG. 2 are not intended to limit the present invention. Indeed, those skilled in the art will recognize that other alternative configurations may be used without departing from the scope of the present invention. In addition, it should be understood that the present invention may also apply to other components than those disclosed herein.

Scalable Data Mining Functions

The Scalable Data Mining Functions 202 comprise complex, optimized SQL statements that are created, in the preferred embodiment, by parameterizing and instantiating the corresponding Analytic APIs 204. The Scalable Data Mining Functions 202 perform much of the advanced analytic processing for data mining applications, when performed by the RDBMS 114, without having to move data from the relational database 116.

The Scalable Data Mining Functions 202 can be categorized by the following functions:

Data Description: The ability to understand and describe the available data using statistical techniques. For example, the generation of descriptive statistics, frequencies and/or histogram bins.

Data Derivation: The ability to generate new variables (transformations) based upon existing detailed data when designing an analytic model. For example, the generation of predictive variables such as bitmaps, ranges, codes and mathematical functions.

Data Reduction: The ability to reduce the number of variables (columns) or observations (rows) used when designing an analytic model. For example, creating Covariance, Correlation, or Sum of Squares and Cross-Products (SSCP) Matrices.

Data Reorganization: The ability to join or denormalize pre-processed results into a wide analytic data set.

Data Sampling/Partitioning: The ability to intelligently request different data samples or data partitions. For example, hash data partitioning or data sampling.

The principal theme of the Scalable Data Mining Functions 202 is to facilitate analytic operations within the RDBMS 114, which process data collections stored in the database 116 and produce results that also are stored in the database 116. Since data mining operations tend to be iterative and exploratory, the database 116 in the preferred embodiment comprises a combined storage and work space environment. As such, a sequence of data mining operations is viewed as a set of steps that start with some collection of tables in the database 116, generate a series of intermediate work tables, and finally produce a result table or view.

Data Derivation

This category of functions provides a variety of column derivations or transformations that are useful prior to designing the analytic model. Sometimes these derivations are required by the analytical modeling method to be used (for example, some methods may require categorical input, while other methods may require numeric input). Even when these derivations are not required by the analytical modeling method, the results of analytical modeling are greatly affected by the measures that can be derived to characterize some type of behavior or quality. This is one of the areas of data mining requiring the most trial and error, and reliance on past experience. Substantial timesaving can be gained by automating the derivation process, and insights from past experiences can be reused by saving and reapplying prior derivation techniques.

Automated Histogram Bin Data Derrivation Assist

One Data Derivation function is the Automated Histogram Bin Data Derrivation Assist, also known by its mnemonic "BINCODE". This function derives a new data element in a relational database 116 based on the relation of a particular value of another data element to that element's overall distribution, sometimes referred to as "binning", but without extracting all of the data elements from the relational database 116. This function is performed in SQL, and the result is saved in a permanent or temporary table in the Analytic LDM 200, or as a view.

The parameters passed to the BINCODE function include a table name, the name of a numeric column, and either the desired number of equal sized bins, the bin width, the boundary values with any spacing, or the number of bins with nearly equal number of values in each bin. The BINCODE function then performs a 1-to-1 transformation by deriving a binned numeric column with the bin number as the column value. When boundary values are provided, if the original column value does not fit within any of the boundaries, a NULL value is assigned. Note that all beginning boundary values are inclusive and that all ending boundary values are non-inclusive except the last.

The main advantages of the BINCODE function are convenience, speed and flexibility. Convenience derives from the fact that data does not have to be extracted from the relational database 116, as well as the fact that the BINCODE function is automated and parameter driven so that a separate program or script does not have to be developed by the user. Speed derives from these same facts, as well as the fact that the BINCODE function is able to take advantage of the parallel architecture of the MPP computer system 100 and RDBMS 114. Flexibility derives from the parameter driven nature of the BINCODE function, which provides many options for defining the bins, in particular by number of equal width bins, by bin width, or by the number of roughly equally distributed bins.

Analytic Logical Data Model

The Analytic LDM 200, which is integrated with the relational database 116 and the RDBMS 114, provides logical entity and attribute definitions for advanced analytic processing, i.e., the Scalable Data Mining Functions 202 and Analytic Algorithms 206, performed by the RDBMS 114 directly against the relational database 116. These logical entity and attribute definitions comprise metadata that define the characteristics of data stored in the relational database 116, as well as metadata that determines how the RDBMS 114 performs the advanced analytic processing. The Analytic LDM 200 also stores processing results from this advanced analytic processing, which includes both result tables and derived data for the Scalable Data Mining Functions 202, Analytic Algorithms 206, and the Parallel Deployer 216. The Analytic LDM 200 is a dynamic model, since the logical entities and attributes definitions change depending upon parameterization of the advanced analytic processing, and since the Analytic LDM 200 is updated with the results of the advanced analytic processing.

Logic of the Preferred Embodiment

Figure 3:
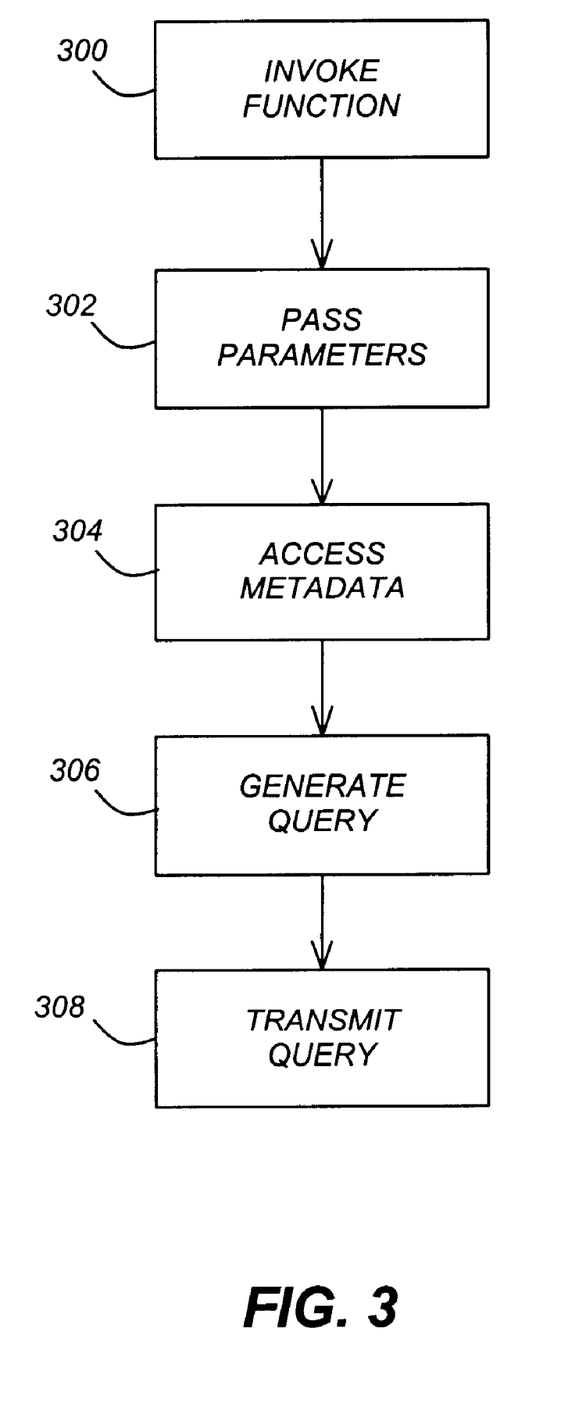
FIGS. 3, 4 and 5 are flowcharts that illustrate exemplary logic performed according to the preferred embodiment of the present invention.
Figure 4:
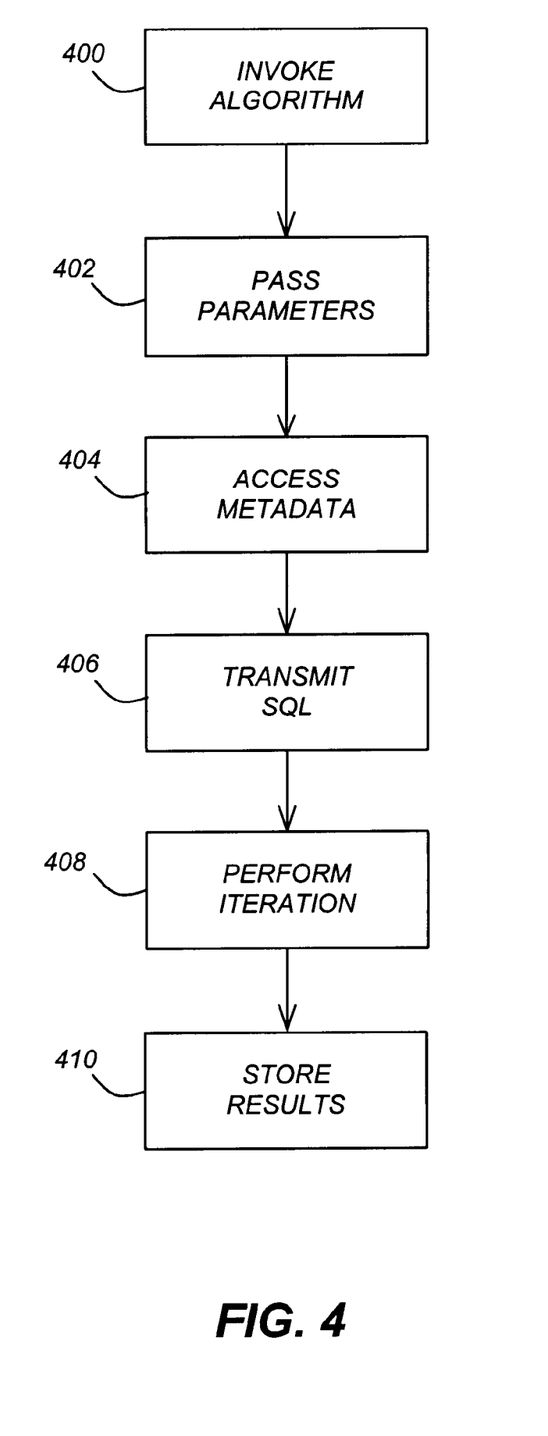
Figure 5:
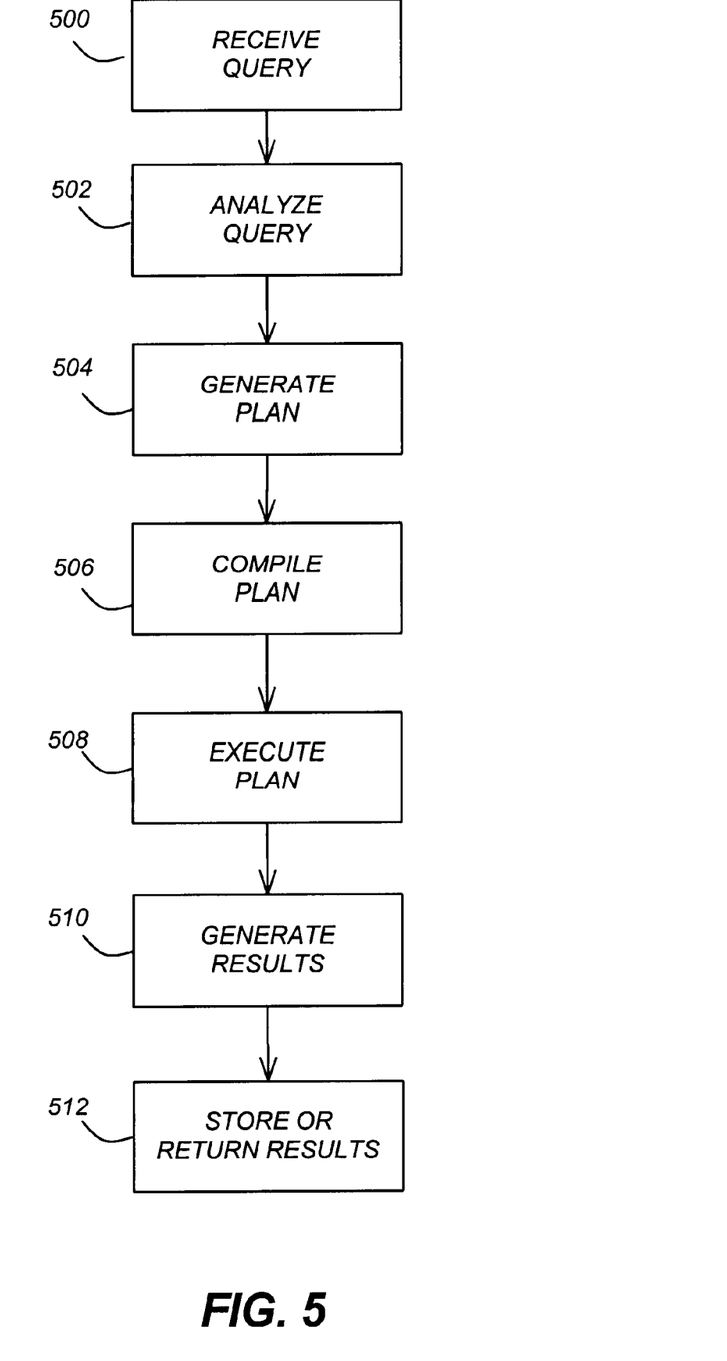

Flowcharts which illustrate the logic of the preferred embodiment of the present invention are provided in FIGS. 3, 4 and 5. Those skilled in the art will recognize that this logic is provided for illustrative purposes only and that different logic may be used to accomplish the same results.

Referring to FIG. 3, this flowchart illustrates the logic of the Scalable Data Mining Functions 202 according to the preferred embodiment of the present invention.

Block 300 represents the one or more of the Scalable Data Mining Functions 202, i.e., the Automated Histogram Bin Data Derivation Assist function, being created via the API 204. This may entail, for example, the instantiation of an object providing the desired function.

Block 302 represents certain parameters being passed to the API 204, in order to control the operation of the Scalable Data Mining Functions 202. In the preferred embodiment, the Automated Histogram Bin Data Derivation Assist function accepts one or more parameters selected from a group comprising: a name of a table in the relational database, a name of a numeric column in the table, and either (a) a desired number of equal sized bins, a bin width, one or more boundary values with spacing, or (b) a number of bins with nearly equal number of values in each bin.

Block 304 represents the metadata in the Analytic LDM 200 being accessed, if necessary for the operation of the Scalable Data Mining Function 202.

Block 306 represents the API 204 generating a Scalable Data Mining Function 202 in the form of a data mining query based on the passed parameters and optional metadata. Thus, the Automated Histogram Bin Data Derivation Assist function is a dynamically generated query comprised of combined phrases with substituting values therein based on parameters supplied to the analytic API 204.

Block 308 represents the Scalable Data Mining Function 202 being passed to the RDBMS 114 for execution. Specifically, the query comprising the Automated Histogram Bin Data Derivation Assist function derives a new data element in the relational database 116 based on a relation of a particular value of another data element to that element's overall distribution in the relational database 116. A null value is assigned to a bin when boundary values are given and a value from the numeric column does not fit within any of the boundaries.

The steps performed by the RDBMS 114 are described in more detail in FIG. 5. Note that the query can be decomposed into a number of steps for parallel execution on the MPP computer system 100 by multiple instances of the RDBMS 114, thereby providing parallelism in the automated histogram bin data derivation assist function.

Referring to FIG. 4, this flowchart illustrates the logic of the Analytic Algorithms 206 according to the preferred embodiment of the present invention.

Block 400 represents the Analytic Algorithms 206 being invoked, either directly or via the Analytic Algorithm API 214.

Block 402 represents certain parameters being passed to the Analytic Algorithms 206, in order to control their operation.

Block 404 represents the metadata in the Analytic LDM 200 being accessed, if necessary for the operation of the Analytic Algorithms 206.

Block 406 represents the Analytic Algorithms 206 passing SQL statements to the RDBMS 114 for execution and Block 408 optionally represents the Analytic Algorithms 206 performing programmatic iteration. Those skilled in the art will recognize that the sequence of these steps may differ from those described above, in that the sequence may not include both steps, it may include additional steps, and it may include iterations of these steps.

Block 410 represents the Analytic Algorithms 206 storing results in the Analytic LDM 200.

Referring to FIG. 5, this flowchart illustrates the logic performed by the RDBMS 114 according to the preferred embodiment of the present invention.

Block 500 represents the RDBMS 114 receiving a query or other SQL statements.

Block 502 represents the RDBMS 114 analyzing the query.

Block 504 represents the RDBMS 114 generating a plan that enables the RDBMS 114 to retrieve the correct information from the relational database 116 to satisfy the query.

Block 506 represents the RDBMS 114 compiling the plan into object code for more efficient execution by the RDBMS 114, although it could be interpreted rather than compiled.

Block 508 represents the RDBMS 114 initiating execution of the plan.

Block 510 represents the RDBMS 114 generating results from the execution of the plan.

Block 512 represents the RDBMS 114 either storing the results in the Analytic LDM 200, or returning the results to the Analytic Algorithm 206, APPL 110, and/or Client 118.

CONCLUSION

This concludes the description of the preferred embodiment of the invention. The following describes an alternative embodiment for accomplishing the same invention. Specifically, in an alternative embodiment, any type of computer, such as a mainframe, minicomputer, or personal computer, could be used to implement the present invention.

In summary, the present invention discloses a method, apparatus, and article of manufacture for performing data mining applications in a massively parallel relational database management system (RDBMS). A scalable data mining function comprising an automated histogram bin data derivation assist function is instantiated and parameterized via an analytic application programming interface (API). The automated histogram bin data derivation assist function comprises a query that is performed directly within the relational database management system, wherein the automated histogram bin data derivation assist function derives a new data element in the relational database based on a relation of a particular value of another data element to that element's overall distribution in the relational database.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented system for performing data mining applications, comprising:
    (a) a computer having one or more data storage devices connected thereto, wherein a relational database is stored on one or more of the data storage devices;
    (b) a relational database management system, executed by the computer, for accessing the relational database stored on the data storage devices; and
    (c) an analytic application programming interface (API), executed by the computer, that generates an automated histogram bin data derivation assist function performed directly within the relational database management system, wherein the automated histogram bin data derivation assist function derives a new data element in the relational database based on a relation of a particular value of another data element to that element's overall distribution in the relational database.

2. The system of claim 1, wherein the automated histogram bin data derivation assist function comprises a binning function.

3. The system of claim 1, wherein the automated histogram bin data derivation assist function accepts one or more parameters selected from a group comprising: a name of a table in the relational database, a name of a numeric column in the table, a desired number of equal sized bins, a bin width, one or more boundary values with spacing, and a number of bins with nearly equal number of values in each bin.

4. The system of claim 3, wherein a null value is assigned to a bin when boundary values are given and a value from the numeric column does not fit within any of the boundaries.

5. The system of claim 1, wherein the computer comprises a parallel processing computer comprised of a plurality of nodes, and each node executes one or more threads of the relational database management system to provide parallelism in the automated histogram bin data derivation assist function.

6. The system of claim 1, wherein the automated histogram bin data derivation assist function processes data stored in the relational database and produces results that are stored in the relational database.

7. The system of claim 1, wherein the automated histogram bin data derivation assist function does not extract the data elements from the relational database.

8. The system of claim 1, wherein results from the automated histogram bin data derivation assist function are saved in a table in an analytic logical data model in the relational database.

9. The system of claim 1, wherein the automated histogram bin data derivation assist function is created by parameterizing and instantiating the analytic API.

10. The system of claim 1, wherein the automated histogram bin data derivation assist function comprises at least one query for execution by the relational database management system.

11. The system of claim 10, wherein the automated histogram bin data derivation assist function is a dynamically generated query comprised of combined phrases with substituting values therein based on parameters supplied to the analytic API.

12. The system of claim 10, wherein the query is a Structured Query Language (SQL) query.

13. A method for performing data mining applications, comprising:
(a) storing a relational database on one or more data storage devices connected to a computer;
(b) accessing the relational database stored on the data storage devices using a relational database management system; and
(c) invoking an analytic application programming interface (API) in the computer to generate an automated histogram bin data derivation assist function that is performed directly within the relational database management system, wherein the automated histogram bin data derivation assist function derives a new data element in the relational database based on a relation of a particular value of another data element to that element's overall distribution in the relational database.

14. An article of manufacture comprising logic embodying a method for performing data mining applications, comprising:
(a) storing a relational database on one or more data storage devices connected to a computer;
(b) accessing the relational database stored on the data storage devices using a relational database management system; and
(c) invoking an analytic application programming interface (API) in the computer to generate an automated histogram bin data derivation assist function that is performed directly within the relational database management system, wherein the automated histogram bin data derivation assist function derives a new data element in the relational database based on a relation of a particular value of another data element to that element's overall distribution in the relational database.

15. The method of claim 13, wherein the automated histogram bin data derivation assist function comprises a binning function.

16. The method of claim 13, wherein the automated histogram bin data derivation assist function accepts one or more parameters selected from a group comprising: a name of a table in the relational database, a name of a numeric column in the table, a desired number of equal sized bins, a bin width, one or more boundary values with spacing, and a number of bins with neatly equal number of values in each bin.

17. The method of claim 16, wherein a null value is assigned to a bin when boundary values are given and a value from the numeric column does not fit within any of the boundaries.

18. The method of claim 13, wherein the computer comprises a parallel processing computer comprised of a plurality of nodes, and each node executes one or more threads of the relational database management system to provide parallelism in the automated histogram bin data derivation assist function.

19. The method of claim 13, wherein the automated histogram bin data derivation assist function processes data stored in the relational database and produces results that are stored in the relational database.

20. The method of claim 13, wherein the automated histogram bin data derivation assist function does not extract the data elements from the relational database.

21. The method of claim 13, wherein results from the automated histogram bin data derivation assist function are saved in a table in an analytic logical data model in the relational database.

22. The method of claim 13, wherein the automated histogram bin data derivation assist function is created by parameterizing and instantiating the analytic API.

23. The method of claim 13, wherein the automated histogram bin data derivation assist function comprises at least one query for execution by the relational database management system.

24. The method of claim 23, wherein the automated histogram bin data derivation assist function is a dynamically generated query comprised of combined phrases with substituting values therein based on parameters supplied to the analytic API.

25. The method of claim 23, wherein the query is a Structured Query Language (SQL) query.

26. The article of manufacture of claim 14, wherein the automated histogram bin data derivation assist function comprises a binning function.

27. The article of manufacture of claim 14, wherein the automated histogram bin data derivation assist function accepts one or more parameters selected from a group comprising: a name of a table in the relational database, a name of a numeric column in the table, a desired number of equal sized bins, a bin width, one or more boundary values with spacing, and a number of bins with nearly equal number of values in each bin.

28. The article of manufacture of claim 27, wherein a null value is assigned to a bin when boundary values are given and a value from the numeric column does not fit within any of the boundaries.

29. The article of manufacture of claim 14, wherein the computer comprises a parallel processing computer comprised of a plurality of nodes, and each node executes one or more threads of the relational database management system to provide parallelism in the automated histogram bin data derivation assist function.

30. The article of manufacture of claim 14, wherein the automated histogram bin data derivation assist function processes data stored in the relational database and produces results that are stored in the relational database.

31. The article of manufacture of claim 14, wherein the automated histogram bin data derivation assist function does not extract the data elements from the relational database.

32. The article of manufacture of claim 14, wherein results from the automated histogram bin data derivation assist function are saved in a table in an analytic logical data model in the relational database.

33. The article of manufacture of claim 14, wherein the automated histogram bin data derivation assist function is created by parameterizing and instantiating the analytic API.

34. The article of manufacture of claim 14, wherein the automated histogram bin data derivation assist function comprises at least one query for execution by the relational database management system.

35. The article of manufacture of claim 34, wherein the automated histogram bin data derivation assist function is a dynamically generated query comprised of combined phrases with substituting values therein based on parameters supplied to the analytic API.

36. The article of manufacture of claim 34, wherein the query is a Structured Query Language (SQL) query.

* * * * *